Patented May 22, 1934

1,959,556

UNITED STATES PATENT OFFICE 1,959,556

MANUFACTURE OF RUBBER ARTICLES

Geoffrey William Trobridge, Sutton Coldfield, England, assignor to Dunlop Rubber Company Limited, London, England, a British company No Drawing. Application October 17, 1932, Serial No. 638,185. In Great Britain November 26, 1931

5 Claims. (Cl. 18—58)

My invention relates to improvements in the manufacture of articles of rubber or similar material by forming deposits thereof from suitable aqueous dispersions on supports or backing strata. The invention relates more particularly to the formation of thin deposits of rubber.

In the production of thin rubber articles it is usually extremely difficult to produce a thin walled article free from bubbles which cause defects in the finished article, and to produce an article of the desired uniformity of wall thickness. The production of thin walled articles from aqueous dispersions is also rendered more difficult in many cases because it is not practicable in such cases to use a coagulant.

An object of my invention is to provide a method of forming rubber articles from aqueous dispersions in which bubbles in the deposited rubber material may be readily avoided, and in which uniformity in wall thickness and structure may be obtained.

In my invention the surface on which the deposit of rubber material is to be made is first coated with a non-coagulating composition comprising one or more polyhydroxy compounds, or other derivatives, in admixture with a volatile solvent. The aqueous dispersion is then brought into contact with the thus treated surface to coat the latter and the deposit or coating thus formed is thereafter coagulated.

The polyhydroxy compounds used in coating the surface are such as have a slight stabilizing action on the dispersion. Polyhydric alcohols, or other derivatives, such as glycerol, glycol, diethylene glycol or alkyl ethers of these, such as glycol monoethyl ether, are examples of suitable polyhydroxy compounds.

These polyhydroxy compounds may be mixed with any suitable volatile solvent such as acetone, alcohol or ether.

As an example of a non-coagulating composition which may be used according to the present invention is a mixture of glycerine and alcohol. The glycerine appears to facilitate wetting by the aqueous dispersion aforesaid and also to act as a slight stabilizer, in this manner, apparently, preventing the coagulation of the deposit until the forces of the surface tension have compensated for any slight inequality of deposition. The alcohol while completely wetting the former, appears to act also as a quickly evaporating diluent for the glycerine, thereby enabling a very thin application of the glycerine to be made uniformly.

The subsequent coagulation of the deposits on the supports or backing strata can be effected by the application of heat, or by the application of coagulants, or by dehydrating and setting means, or by combinations of these various means. Where a former is used, it can be internally heated during the immersion in the aqueous dispersion, or subsequent thereto, or both during immersion and subsequently thereto. Articles of appreciable thickness may be made by successive thinner coatings.

The various coating compositions may be applied in any of the usual operations such as dipping, pouring, spreading or spraying, and the supporting surface or former may be of various materials such as glass, metal, porcelain, hard or soft rubber, clay or fabric. The term "rubber" is used in its broadest significance as including natural or artificial aqueous dispersions of India rubber, or similar vegetable resins such as gutta percha or balata with or without the addition of aqueous dispersions or emulsions of rubber-like substances such as synthetic rubbers, mineral rubbers or rubber substitutes such as factice or rubber reclaim, or rubber waste or oils, for example, rape oil or vulcanized oils or cellulose esters or proteins, for example, casein. The dispersions may be concentrated or compounded, or both compounded and concentrated. A compounded concentrate such as described in Patent 1,846,164 is suitable. The compounding ingredients may comprise vulcanizing agents such as sulphur, organic accelerators and reinforcing agents such as whiting, clay, barium sulphate, lithopone, lamp black, gas black, zinc oxide or powdered ebonite or vulcanite, coloring matters, preservatives or softeners.

An example of carrying the invention into effect is as follows:

Example I

A non-coagulating composition suitable for the production of thin rubber dipped goods from rubber latex, such as finger cots, can be made as follows:

| | Parts by weight |
|---|---|
| Glycerine | 5 |
| 95% alcohol | 95 |

This composition is then wiped over a former, for instance of glass, by means of a cloth so as to produce a coating thereof. The thus coated former is allowed to stand for about one minute until the alcohol has evaporated. This is then dipped into a latex bath of 55–60% total solids of the following composition:

| | Parts by weight |
|---|---|
| Rubber | 100 |
| Sulphur | 2 |
| Zinc oxide | 1 |
| Zinc diethyl-dithio-carbamate | 1 |
| Transformer oil | 5 |

The former with the liquid film of latex mixing is then removed from the bath. On withdrawal the former is rotated so as to obviate variations in thickness of deposit, and is then carefully inverted and placed over a jet of steam so that the former is internally heated.

The dried deposit is then suitably treated in any known manner, e. g., vulcanized in steam for ten minutes at 15 lbs. pressure per square inch.

Through the above invention a smooth, uniform deposit, free from bubbles, is obtained through the action of the glycerine or other polyhydroxy compound in causing the dispersion to wet the forming surface uniformly and to prevent coagulation until the deposit will have had an opportunity to become uniformly distributed.

What I claim is—

1. A method for the production of articles from aqueous dispersions of rubber which comprises coating a supporting surface with a non-coagulating composition comprising polyhydroxy organic compounds in admixture with a volatile solvent, evaporating solvent from said coating, coating the thus treated supports with an aqueous dispersion of rubber, and coagulating the coating.

2. A process as in claim 1 in which the polyhydroxy compounds are polyhydric alcohols.

3. The process as claimed in claim 1 in which the volatile solvent is a member of the group consisting of acetone, alcohol and ether.

4. The method of claim 1 in which the non-coagulating composition is a mixture of glycerine and alcohol.

5. The process as claimed in claim 1 in which the supporting surface is internally heated.

GEOFFREY WILLIAM TROBRIDGE.